US012688499B2

(12) United States Patent
Leddy et al.

(10) Patent No.: US 12,688,499 B2
(45) Date of Patent: Jul. 21, 2026

(54) DEVICE AND SYSTEMS FOR PROVISIONING AND VERIFYING TOKENS WITH STRONG IDENTITY AND STRONG AUTHENTICATION

(71) Applicant: LOGIN ID INC., San Matero, CA (US)

(72) Inventors: William Leddy, Lakeway, TX (US); Simon Law, San Mateo, CA (US)

(73) Assignee: LOGIN ID INC., San Mateo, CA (US)

( * ) Notice: Subject to any disclaimer, the term of this patent is extended or adjusted under 35 U.S.C. 154(b) by 54 days.

(21) Appl. No.: 18/230,456

(22) Filed: Aug. 4, 2023

(65) Prior Publication Data

US 2024/0046252 A1     Feb. 8, 2024

Related U.S. Application Data

(60) Provisional application No. 63/395,213, filed on Aug. 4, 2022.

(51) Int. Cl.

| | |
|---|---|
| *G06Q 20/02* | (2012.01) |
| *G06Q 20/12* | (2012.01) |
| *G06Q 20/36* | (2012.01) |
| *G06Q 20/38* | (2012.01) |
| *G06Q 20/40* | (2012.01) |

(52) U.S. Cl.
CPC ......... *G06Q 20/3674* (2013.01); *G06Q 20/12* (2013.01); *G06Q 20/3829* (2013.01); *G06Q 20/388* (2013.01); *G06Q 20/401* (2013.01); *G06Q 2220/00* (2013.01)

(58) Field of Classification Search
CPC .............. G06Q 20/3674; G06Q 20/12; G06Q 20/3829; G06Q 20/388; G06Q 20/401; G06Q 2220/00; G06Q 20/40145; G06Q 20/02; G06Q 20/3821; G06Q 20/385; G06Q 20/409; G06Q 30/0613
See application file for complete search history.

(56) References Cited

U.S. PATENT DOCUMENTS

| | | | | | |
|---|---|---|---|---|---|
| 11,081,214 | B1 * | 8/2021 | Whitaker | ............ | G06F 21/6245 |
| 2014/0082715 | A1 * | 3/2014 | Grajek | ................ | H04W 12/068 726/8 |
| 2019/0020478 | A1 * | 1/2019 | Girish | ................... | H04L 9/3271 |
| 2019/0036924 | A1 * | 1/2019 | Wang | ..................... | H04W 76/10 |

(Continued)

FOREIGN PATENT DOCUMENTS

| | | | | | |
|---|---|---|---|---|---|
| CA | 2945703 | C | * | 9/2019 | ......... G06Q 30/0609 |

OTHER PUBLICATIONS

"Symbolon: Enabling Flexible Multi-device-based User Authentication", Thalia Laing, IEEE Xplore, Jun. 2022 (Year: 2022).*

*Primary Examiner* — Duan Zhang

(57) ABSTRACT

Tokens are used for payment systems. The tokens are references or proxies to actual payment credit card or banking card numbers to improve security. However, verification of these tokens are often limited and rigid systems and are prone fraud. An improved token framework system is provided to allow for different entities to provision and verify the tokens using strong identity and strong authentication at the device level. For example, biometric identity and verification using the mobile device is used to authenticate the tokens during provisioning and subsequent transactions.

5 Claims, 10 Drawing Sheets

(56) References Cited

U.S. PATENT DOCUMENTS

| 2019/0303928 A1* | 10/2019 | Kaladgi | G06Q 20/385 |
| 2021/0352072 A1* | 11/2021 | Effing | H04L 9/3213 |
| 2022/0391908 A1* | 12/2022 | Opushnyev | G06Q 20/386 |

* cited by examiner

FIG. 9

| PAN | URL |
|---|---|
| 5612410117238917 | https://auth1.com/923-452-94ll |
| 4612182917236574 | https://authsvc.io/aad900808q43 |
| 4100243529002251 | https://auth1.com/9270-2452-17 |
| ... | ... |

FIG. 10

| BIN | URL |
|---|---|
| 41002435 | https://auth1.com/8719245223 |
| 53891458 | https://auth1.com/57685eghdgf644 |
| 54001918 | https://auth1.com/56790123sfgsfg11900 |
| ... | ... |

FIG. 8

TSP lookup

URL = findPanUrl(TR_TSP)

if (URL == null) URL = findPanUrl(PAN)

if (URL == null) URL = findIssuerUrl(BIN)

if (URL == null) URL = defaultDelegation

DEVICE AND SYSTEMS FOR PROVISIONING AND VERIFYING TOKENS WITH STRONG IDENTITY AND STRONG AUTHENTICATION

CROSS-REFERENCE TO RELATED APPLICATION

This patent application claims priority to United States Provisional Patent Application no. 63/395,213, filed on Aug. 4, 2022, and titled "DEVICE AND SYSTEMS FOR PROVISIONING AND VERIFYING TOKENS WITH STRONG IDENTITY AND STRONG AUTHENTICATION", the entire contents of which are herein incorporated by reference.

TECHNICAL FIELD

The following generally relates to digital authentication, and more particularly to provisioning and verifying tokens with strong identity and strong authentication.

DESCRIPTION OF THE RELATED ART

Computing hardware and devices, such as desktop computers, laptops, smart phones, cell phones, tablets, etc., are used to execute computations amongst different devices belonging to different parties or owners. For example, in electronic payments, a user (or a buyer) makes an electronic transaction with a digital merchant using the user's credit card, and this transaction and credit card payment information is passed to a credit card issuer (e.g., a bank) and a credit card company to verify and settle payment between the user's credit card account and the merchant. The merchant can be equipped with an online digital storefront to accept the payment, such as a website. In another example, the merchant is a physical storefront that includes an electronic point of sale terminal that is connected to the Internet.

In an example aspect, tokens are bound to computing hardware or the device of the user to offer a higher level of digital security. Tokens are also established as references or proxies to the actual credit card numbers of a user. For example, a token is a reference or proxy to a Primary Account Number (PAN). The mapping or link between a given token and a PAN is established and securely stored during a registration process. During subsequent transactions, the token is passed through a payment network in order to protect the actual credit card number or PAN. This improves digital security.

It is herein recognized that typically only one party and their computing hardware are used to provision and verify the tokens. This leads to security operations being fixed to a party, which can be limiting. It is also herein recognized that the party conducting the token provisioning and token verification is then prone to more security risks and attacks, and may also require further external transfer of data for verification, for example, where the party is not the card issuer or the merchant.

It is also herein recognized that the use of tokens is also prone to fraud and attacks. For example, tokens can be compromised and used in fraudulent transactions by another device that does not belong to the intended user.

BRIEF DESCRIPTION OF THE DRAWINGS

Embodiments will now be described by way of example only with reference to the appended drawings wherein:

FIG. 8 is an example of code for a look up operation.

FIGS. 9 and 10 are examples of lookup tables.

DETAILED DESCRIPTION

Figure 1A:
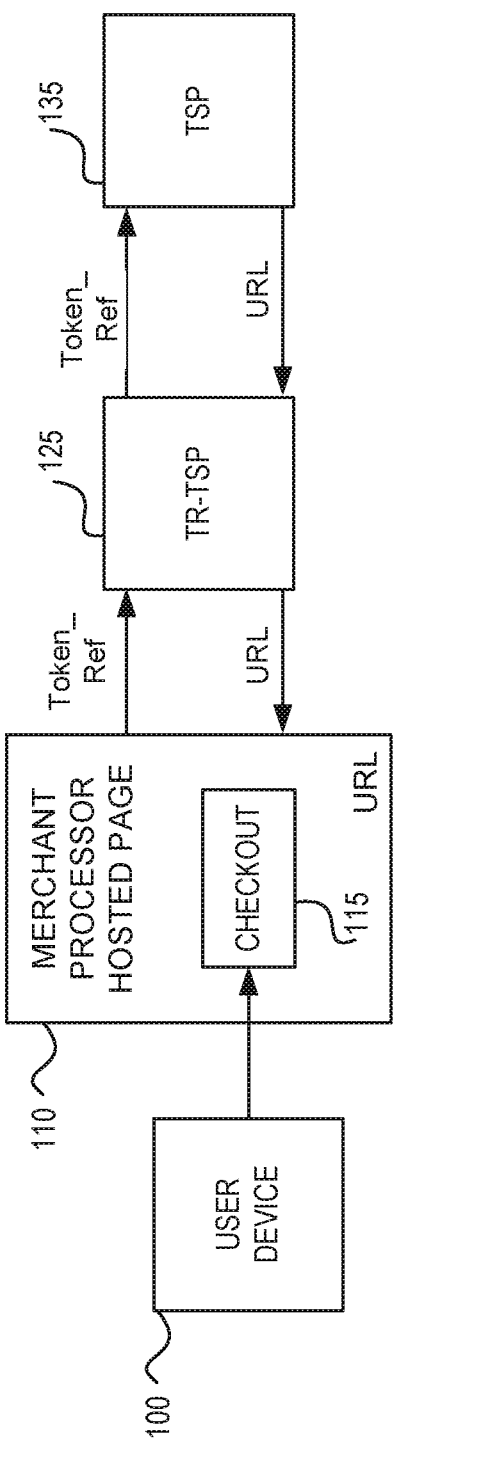
FIG. 1A is a schematic diagram showing a flow of a transaction using a token in a conventional token framework.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Within this specification, different structural entities (which may variously be referred to as "nodes", "units", "circuits", "systems", "processors", "module", "interface", "device", "server", other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform one or more tasks during operation. A structure can be said to be "configured to" perform some task even if the structure is not currently being operated. A "biometric sensor configured to collect biometric data" is intended to cover, for example, an integrated circuit that has circuitry that performs this function during operation, even if the integrated circuit in question is not currently being used (e.g., a power supply is not powering it). Thus, an entity described or recited "configured to" perform some task refers to something physical, such as a device, circuit, memory storing program instructions executable to implement the task, etc. This phrase is not used herein to refer to something intangible. Thus, the "configured to" construct is not used herein refer to a software entity, such as an application programming interface (API).

The term "configured to" is not intended to mean "configurable to." An unprogrammed Field Programmable Gate Array (FPGA), for example, would not be considered to be "configured to" execute some specific operation, although it may be "configurable to" perform that specific operation and may be "configured to" execute that specific function after programming.

Reciting in the appended claims that a structure is "configured to" perform one or more tasks is intended not to be interpreted as having means-plus-function elements.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this specification, numerous specific details have been set forth. It is to be understood, however, that implementations of the disclosed technology may be practiced without these specific details. In other instances, well-known methods, structures, and techniques have not been shown in detail in order not to obscure an understanding of this description. References to "for example", "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Devices, systems and processes are herein provided for using strong identity and strong authentication to provision tokens and verify tokens in a dynamic manner.

For example, during provisioning and use of the token, strong authentication using strong identity of the user is executed. For example, Fast Identity Online (FIDO) authentication uses device authenticator keys stored with secure hardware of a user device.

In another example aspect, different parties can provision the token using FIDO authentication for a user's credit card number.

In an example aspect, the system provided herein improves authentication frameworks currently used by payment networks. In another example aspect, the system provides herein leverages FIDO authentication and federation for multi-platform use. In another example aspect, the system provided herein is facilitates dynamic linking.

In another example aspect, the system provided herein enables various authentication parties to be provision and verify the tokens, within the same system. These other parties include a delegated authenticator service (for example, delegated by the payment network), a card issuer authenticator, and a trusted token service provider authenticator.

From a merchant's perspective, in an example aspect, the system provided herein enables security liability, lowers interchange, decreases chargeback occurrences, and increases successful authorization.

From the card issuer's perspective, in an example aspect, the systems facilitates the issuer to be the authentication provider, which allows for tokenization and digital authentication of credit card to become more widely implemented in various merchant and payment server systems. The system, for example, also reduces fraud and increases the security for token-based transactions.

In an example aspect, a system is provided that includes a merchant server comprising a checkout plugin configured to provide a token, at least one token service provider server configured to search a lookup table to obtain a URL corresponding to the token, and a FIDO service provider configured to challenge a user device via the checkout plugin and issue a token authentication verification value (TAVV) to the merchant server. In an example aspect, the merchant server is configured to transmit the TAVV, the token, and transaction data for a transaction into an electronic payment network to complete the transaction.

In an example aspect, the at least one token service provider stores the lookup table and the lookup table comprises a plurality of URLs and tokens.

In an example aspect, the merchant server is configured to provide a webpage for display on the user device for the transaction, the webpage comprising the checkout plugin that is configured to receive payment information from a user.

In an example aspect, the checkout plugin is configured to transmit the token to the token service provider.

In an example aspect, during a registration process, the FIDO service provider is configured to send a FIDO registration URL to connect with the user device, and after successfully receiving from the user device a FIDO registration response, the FIDO registration response including a FIDO public key, the FIDO service provider binds a FIDO public key with the token.

In an example aspect, during the registration process, the token or a token reference, or both, are stored in association with an authentication URL.

Turning to FIG. 1A, the system shows a flow in which a token has already been provisioned. The token is a reference or proxy to a user's actual credit card information, such as a credit card number or PAN. In an example aspect, the token has the same format as the user's actual credit card number. The token is bound to the user device 100. As a result of the provisioning, a Token Service Provider (TSP) 135 server stores the token and an online data link, such as uniform resource locator (URL) in a look-up table. It will be appreciated that the term "server" herein refers to a computing server system with a processor, memory, and communication module. The URL points to the authenticator that stores the actual credit card number. The Token Requestor TSP (TR-TSP) 125 is a trusted token service provider server that is an intermediary between the merchant and the TSP 135.

FIG. 1A provides an exemplary transaction flow in accordance with conventional systems. As per FIG. 1A, the user device 100 accesses a merchant processor's website 110 via the Internet, for example, using an Internet browser. A checkout plugin module 115 (e.g., implemented as an iframe) on the website includes a checkout button, which when selected or clicked on, triggers the checkout plugin module 115 to send a token (e.g., Token_ref) to the TR-TSP 125, and the TR-TSP 125 in turn sends the token to the TSP 135. The TSP 135 executes a lookup on a look-up table stored on the TSP 135 using the token to find a URL. The URL is returned to the checkout plugin module 115. The checkout plugin module 115 then transmits the token (e.g., Token_ref) to the server designated by the URL.

Figure 1B:
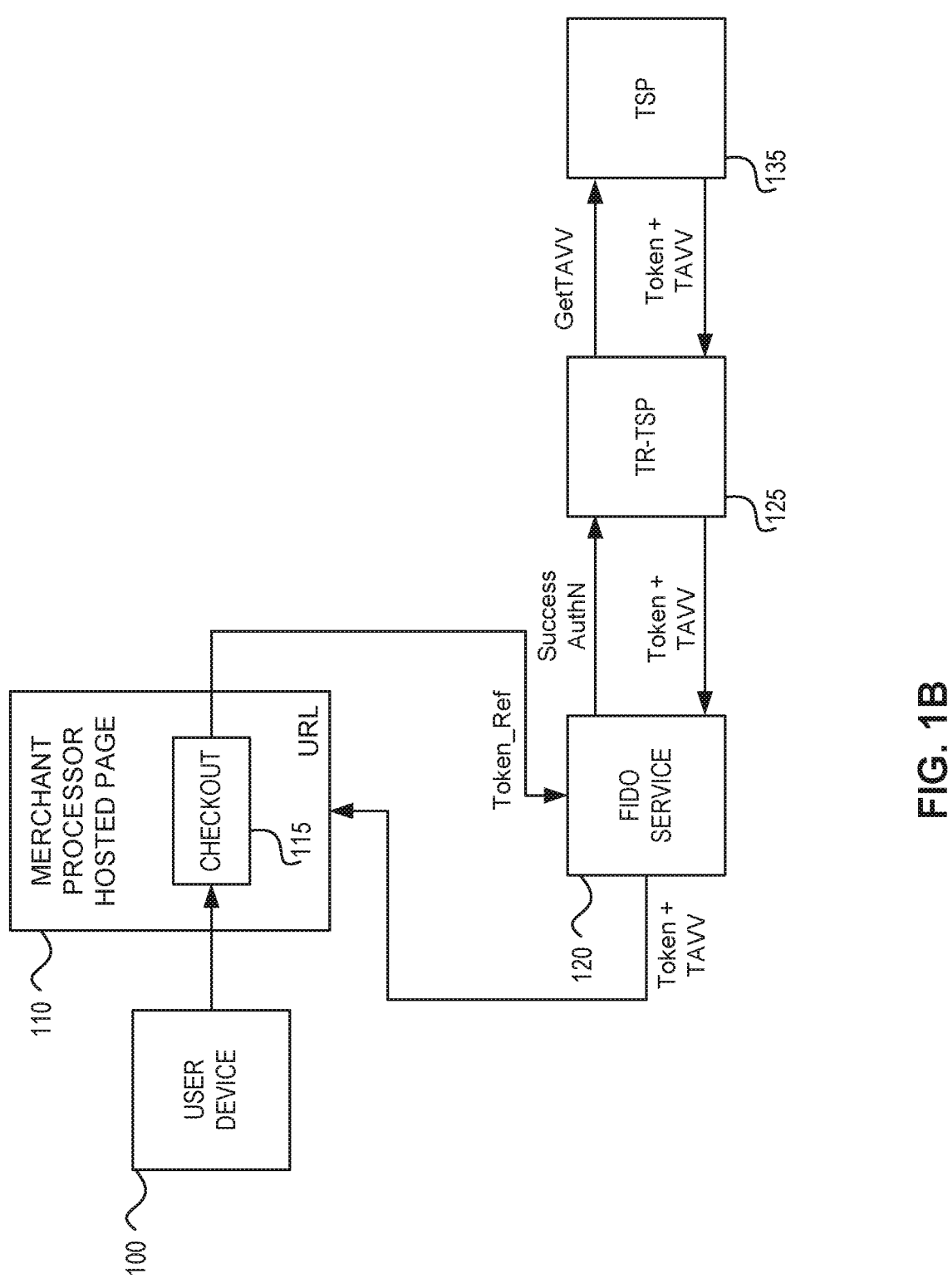
FIG. 1B is a schematic diagram showing a flow of a transaction using a token in a dynamic token framework in accordance with at least one example embodiment.

FIG. 1B provides an exemplary transaction flow according to an example embodiment of the present disclosure. As per FIG. 1B, the user device accesses the merchant processor's website 110 via the Internet. The checkout plugin module 115 on the website includes a checkout button, which when selected or clicked on, triggers the checkout plugin module 115 to send a token (e.g., Token_ref) to the FIDO service 120. After the FIDO service 120 completes FIDO authentication with the user device 100, it transmits a success indicator (e.g., Success AuthN) to the TR-TSP 125. The TR-TSP 125 transmits a get request (e.g., getTAVV) to obtain the Token Authentication Verification Value (TAVV) from the TSP 135. The get request for the TAVV can be the token (e.g., Token_ref). The TSP 135 verifies the token and, if successfully verified, returns the TAVV and the token. The TAVV and token get passed back to the merchant 110, which is used to process the payment with the card issuer. FIDO may include any combination of user password, device identification, and knowledge factor.

Figure 2:
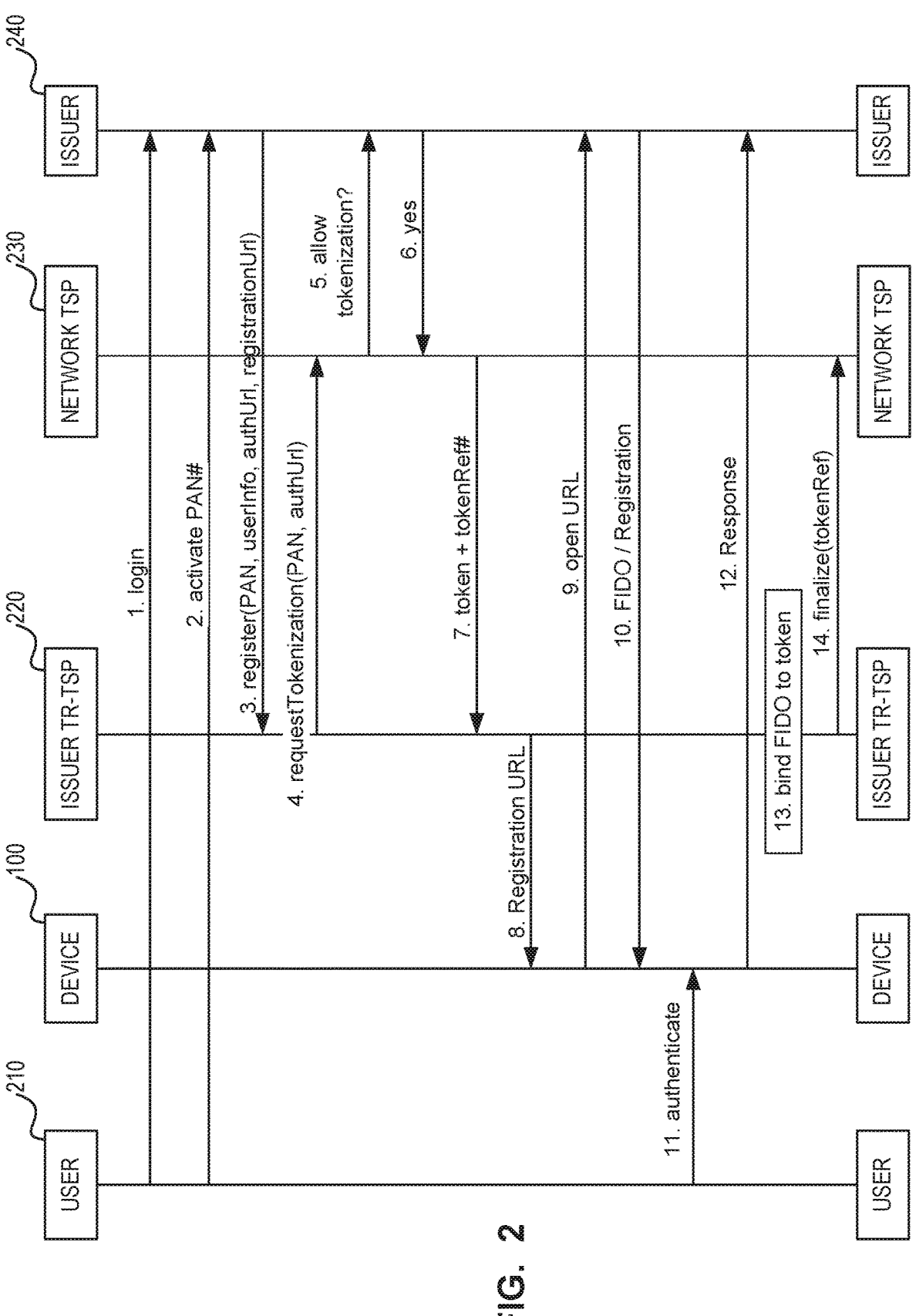
FIG. 2 is a flow diagram of a registration process that includes binding a strong customer authentication (SCA) to a token, and computing the SCA with registration is performed between an issuer server and the user device in accordance with at least one example embodiment.

FIG. 2 shows a flow diagram with a user device 100 registering for and obtaining their token with a card issuer 240, including prompting FIDO authentication by the card issuer 240. The transaction flow in FIG. 2 represents a user 210 logging in to a banking app or website.

Figure 11:
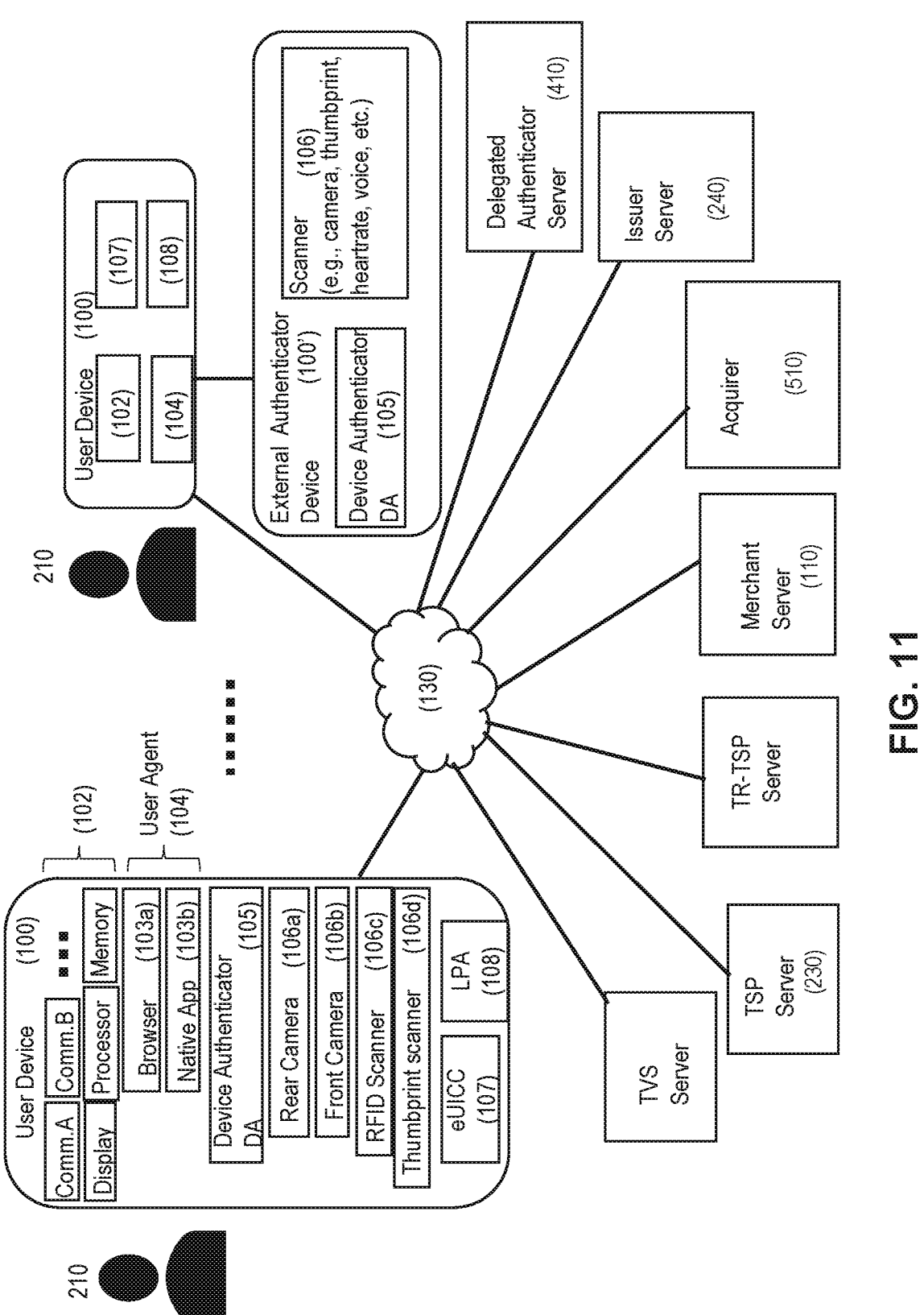
FIG. 11 is a schematic diagram of a system of user devices and server systems that include, for example, an ID server, a Service Provider server and a trusted verifier server in accordance with at least one example embodiment.

At step 1 a user 210 logs in to the issuer 240 and provides login information. The issuer 240 may be a banking or credit card provider. The user 210 furnishes the issuer 240 with login information that may include, for example, a user identifier and password. At step 2, an activate PAN request is sent to the issuer 240. This initiates a registration session, which, in some cases, is identifiable with a registration session ID. At step 3, the issuer 240 returns a registration request to the card issuer TR-TSP 220 which includes, for example, the PAN, user 210 information, an authentication URL, and a registration URL. The authentication URL is used in subsequent transactions, and in this example scenario, points to the issuer 240. See FIG. 5, for example. The registration URL is used for the registration process. Continuing with FIG. 2, at step 4, the issuer TR-TSP 220 issues a tokenization request to the network TSP 230 for tokenizing the PAN and the authentication URL. At step 5, the network TSP 230 sends a message requesting the issuer 240 to confirm if tokenization is allowed, and this is confirmed by the issuer 240 at step 6. At step 7, a token and a token reference number are sent from the network TSP 230 to the issuer TR-TSP 220. At step 8, the issuer TR-TSP sends the registration URL that is associated with the present registration session to the user device 100. When the user device 100 opens the registration URL at step 9, it is directed to the issuer 240. At step 10, the issuer 240 requests FIDO/registration from the user device 100. The user 210 authenticates this at the user device 100 at step 11. For example, the user device 100 executes biometric scan of the user to authenticate the user. If the biometric authentication is successful, a FIDO private key and a corresponding FIDO public key are generated and stored on the user device's device authenticator 105 (as shown in FIG. 11). Continuing with FIG. 2, the user device 100 provides a response to the issuer 240 at step 12. In some cases, the response includes the FIDO public key. At step 13, there is an action to bind the FIDO public key to the token at the issuer TR-TSP 220. At step 14 the finalized token reference (also herein called token_ref and tokenRef) is sent to the network TSP 230, where the token reference stored in association with the authentication URL. More generally, a token or a token reference, or both, are stored in association with an authentication URL. These are stored in a database or a look-up table.

In some other cases, another type of strong customer authentication (SCA) is used instead of FIDO credentials. For example, other types of SCA include time-based one-time passwords (TOTP) and SMS messages. Another type of SCA, in alternative to the FIDO credentials, may be bound to the token.

Figure 3:
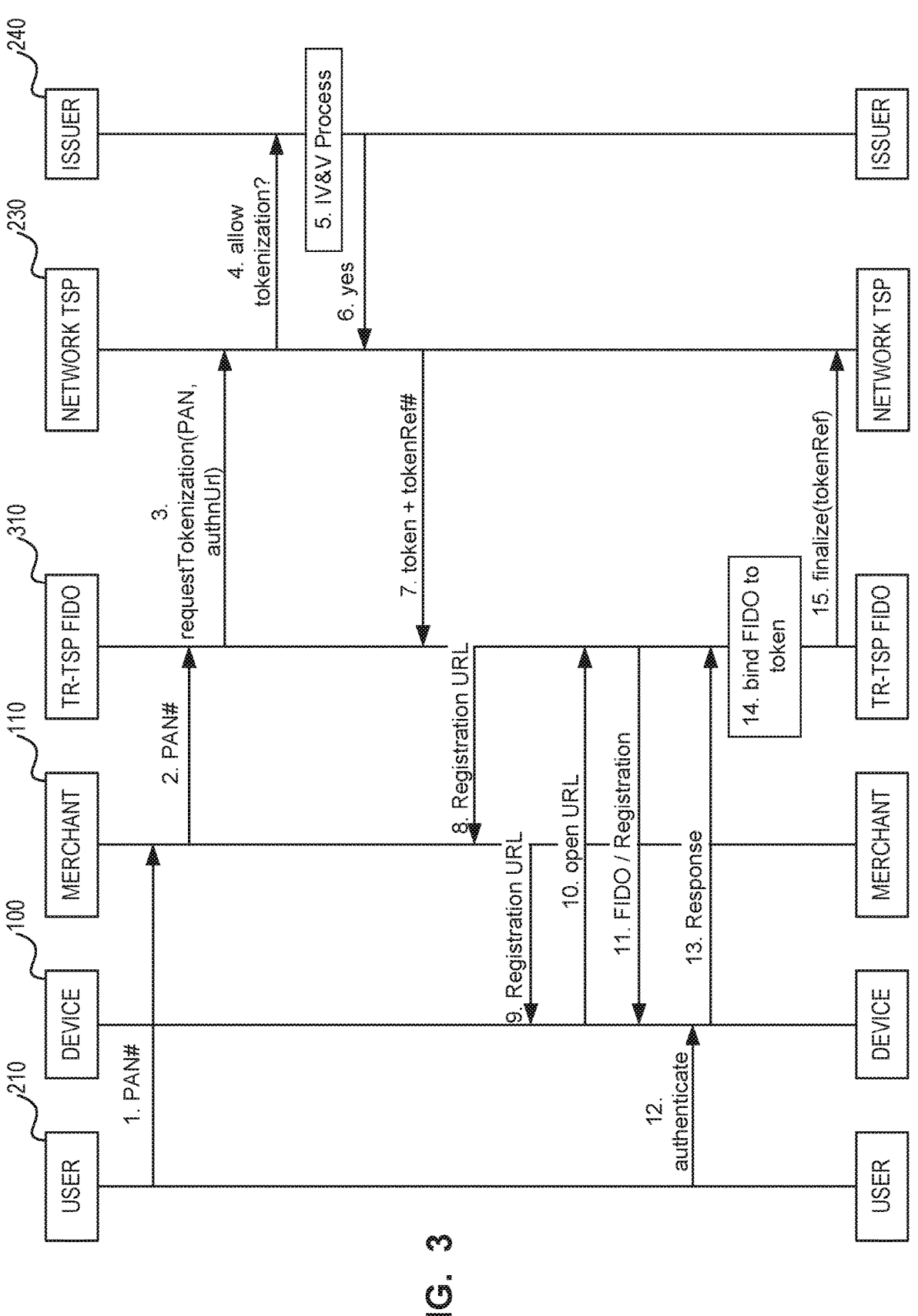
FIG. 3 is a flow diagram of a registration process that includes binding a SCA to a token, and computing the SCA with registration is performed between a token requester—token service provider (TR-TSP) server and the user device in accordance with at least one example embodiment.

FIG. 3 shows a flow diagram with a user device 100 registering for and obtaining their token with a TR-TSP 125, including prompting FIDO authentication by the TR-TSP 125. In the example scenario in FIG. 3, the TR-TSP is also referenced as 310 as it is configured to conduct FIDO computations. This is an alternative example embodiment to the registration process shown in FIG. 2. The transaction flow in FIG. 3 represents a user 210 making a purchase via a merchant website 110. At step 1, the user 210 submits a PAN to the merchant 110, e.g. through their website. The merchant 110 relays the PAN to the TR-TSP 310 associated with the FIDO service. At step 3 a tokenization request is sent to the network TSP 230, which may include a request to tokenize the PAN and the authentication URL, for example. At step 4, the network TSP 230 checks with the issuer 240 that the tokenization is allowed. An action is taken at step 5 whereby an independent verification and validation (IV&V) process is performed by the issuer 240. At step 6 the issuer 240 confirms that tokenization is allowed. The network TSP 230 forwards a token and a token reference number to the TR-TSP 310 associated with the FIDO service at step 7. At step 8 the registration URL is forwarded to the merchant 110, and then passed to the user device 100 at step 9. At step 10 the user device 100 opens the URL, directing to the TR-TSP 310 associated with the FIDO service. At step 11, the TR-TSP 310 associated with the FIDO service requests FIDO/registration from the user device 100. The user 210 authenticates this at the user device 100 at step 12. This authentication process includes, for example, the user device obtaining a biometric scan of the user 210 to authenticate the user and generating a FIDO private key and a FIDO public key. The FIDO private key is stored in the device authenticator 105 (see FIG. 11). A response (e.g., which includes the FIDO public key) is sent to the merchant 110 at step 13. At step 14, there is an action to bind the FIDO public key to the token at the TR-TSP 310 associated with the FIDO service. At step 15 the finalized token reference is sent to the network TSP 230, and the token reference is stored in association with the authentication URL. More generally, a token or a token reference, or both, are stored in association with an authentication URL. These are stored in a database or a look-up table.

Figure 4:
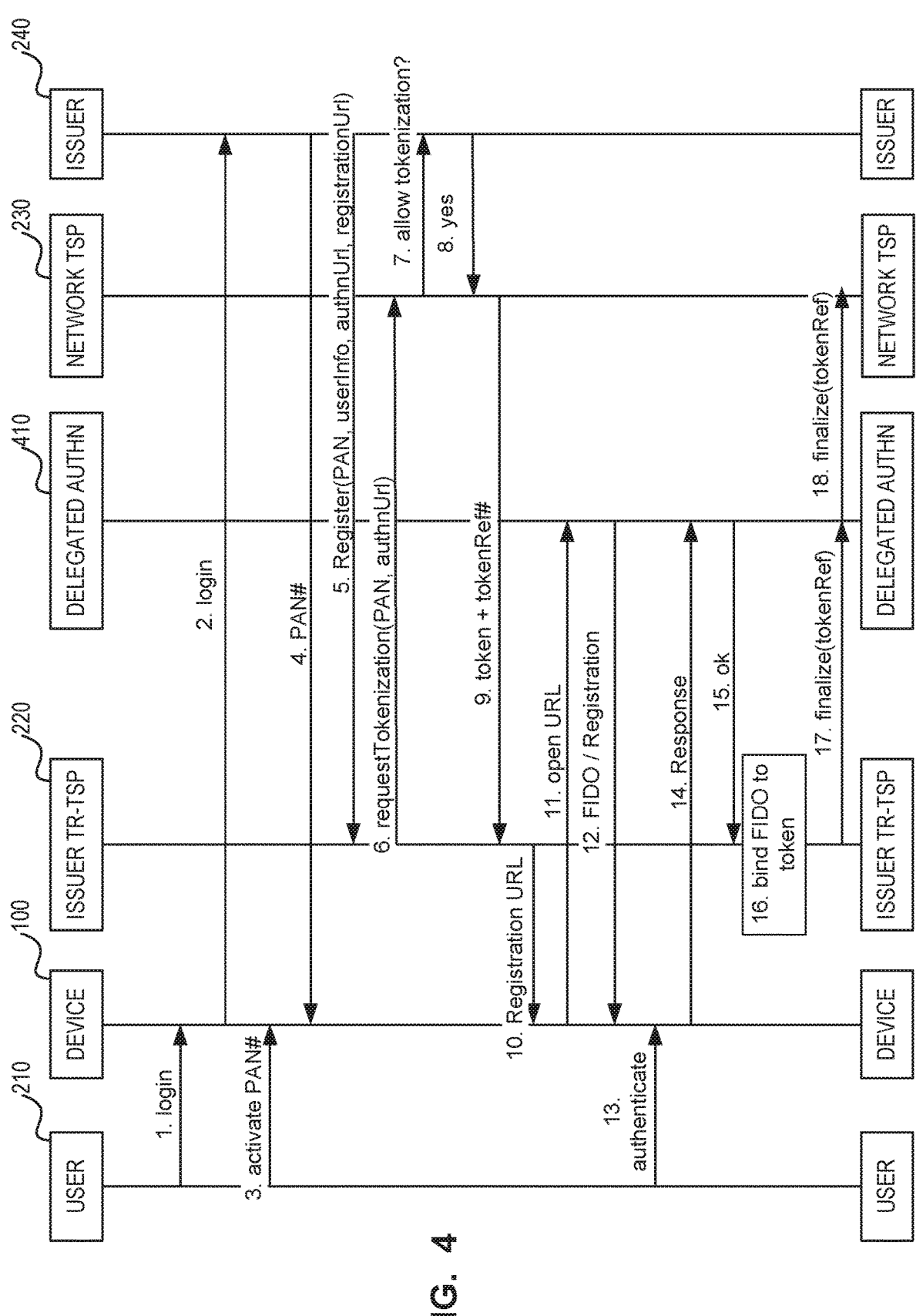
FIG. 4 is a flow diagram of a registration process that includes binding a SCA to a token, and computing the SCA with registration is performed between a delegated authentication server and the user device in accordance with at least one example embodiment.

FIG. 4 shows a flow diagram with a user device 100 registering for and obtaining their token with a delegated authentication service 410, including prompting FIDO authentication by the delegated authentication service 410. The transaction flow in FIG. 4 represents a user 210 logging in to a banking app or website. At step 1, the user 210 logs in to the issuer 240 and provides login information. The issuer 240 may be a banking or credit card provider. The login may include, for example, a user identifier and password. At step 2 the login information is forwarded by the user device 100 to the issuer 240. At step 3, the user 210 initiates an activate PAN request at the user device 100. At step 4, the issuer 240 provides a PAN to the user device 100. At step 5, the issuer 240 sends a registration request to the issuer TR-TSP 220 which includes, for example, the PAN, user 210 information, an authentication URL, and a registration URL. For example, the authentication URL points to the issuer 240. In this example, the registration URL points to the delegated authentication server 410. At step 6, the issuer TR-TSP 220 then issues a tokenization request to the network TSP 230 for tokenizing the PAN and the authentication URL. At step 7 the network TSP 230 confirms that tokenization is allowed with the issuer 240. At step 8, the issuer 240 issues a response that the tokenization is allowed. The network TSP 230 forwards a token and a token reference number to the issuer TR-TSP 220 at step 9. At step 10, the issuer TR-TSP 220 sends a registration URL to the user device 100. The user device 100 opens the URL and is directed to the delegated authentication server 410 at step 11. At step 12 the delegated authentication server 410 requests FIDO/registration from the user device 100. The user 210 authenticates this at the user device 100 at step 13. This authentication process includes, for example, the user device obtaining a biometric scan of the user 210 to authenticate the user and generating a FIDO private key and a FIDO public key. The FIDO private key is stored in the device authenticator 105 (see FIG. 11). The response (which includes the FIDO public key) is sent from the user device 100 to the delegated authentication server 410 at step 14, and the delegated authentication service 410 confirms this at step 15 with the issuer TR-TSP 220. At step 16 there is an action to bind the FIDO credential (e.g., the FIDO public key) to the token at the issuer TR-TSP 220. At step 17 the finalized token reference is sent to the delegated authentication service 410. In some cases, this token reference is stored in association with an authentication URL at the network TSP at step 18. More generally, a token or a token reference, or both, are stored in association with an authentication URL. These are stored in a database or a look-up table.

It will be appreciated that the operations in each of FIG. 2-4 can occur with different users 210 or different payment cards, and the system 10 provided herein has the dynamic capability able to facilitate different combinations of these scenarios. In particular, the issuer TR-TSP 220 stores the URLs for different authenticators associated with different tokens.

Figure 5:
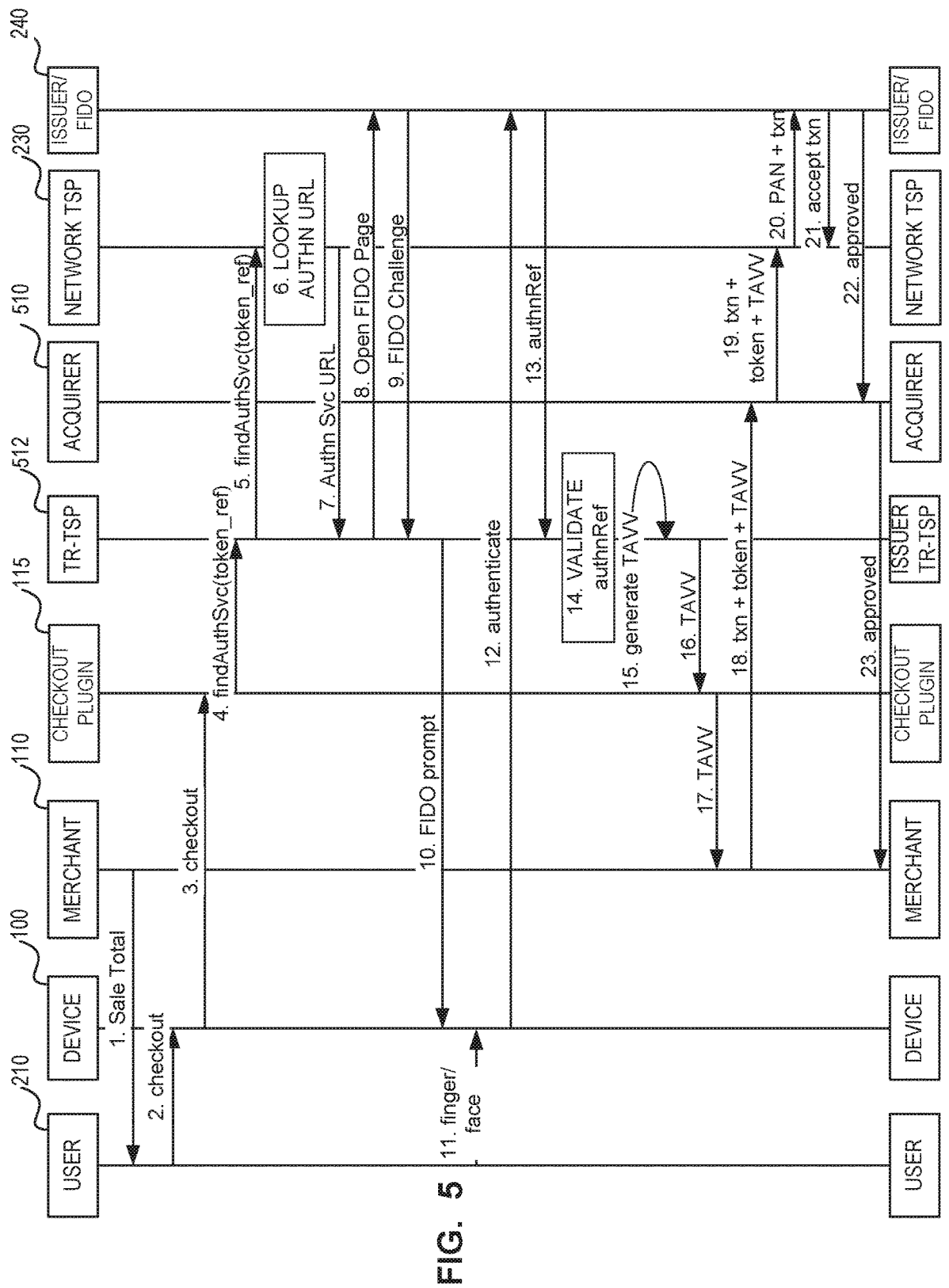
FIG. 5 is a flow diagram of a transaction or checkout process using a token in a dynamic token framework, and computing the SCA is performed between the issuer server and the user device in accordance with at least one example embodiment.

FIG. 5 shows a flow diagram where, during the registration process, the issuer 240 was designated as the authenticator. In an example aspect, this transaction flow diagram in FIG. 5 follows the registration process shown in FIG. 2. Therefore, the URL provided by the TSP 330 points to the issuer 240 for authenticating the token. In an example aspect, the issuer 240 is also the party that issues the FIDO challenge. The transaction flow in FIG. 5 represents a user 210 making a purchase via a merchant website 110. At step 1 the merchant 110 sends a sale total to a user 210. At step 2 the user 210 commences the checkout process at the user device 100. At step 3, the user device 100 directs to the checkout plugin 115. At step 4, the checkout plugin 115 sends a findAuthSvc(token_ref) instruction to the TR-TSP 512. The TR-TSP 512 may be any TR-TSP such as, for example, the issuer TR-TSP 220 or the TR-TSP 310 associated with the FIDO service. In the example shown, however, the TR-TSP 512 is the issuer TR-TSP 220 that has bound the FIDO public key with the token. At step 5 the TR-TSP 512 forwards the findAuthSvc(token_ref) instruction to the network TSP 230. There is an action at step 6 for the network TSP 230 to lookup the authentication URL that it has stored in association with the token_ref. In other words, the network TSP uses the token_ref to find the associate authentication URL. Alternatively, the lookup of the authentication URL may be performed by the TR-TSP 512, in the example case where the TR-TSP 512 has stored the authentication URL in association with the token_ref during registration. At step 7 the network TSP 230 sends the authentication URL to the TR-TSP 150. At step 8 the TR-TSP 512, using the authentication URL, opens the FIDO page which directs to the issuer 240. The issuer 240 then sends a FIDO challenge at step 9 to the TR-TSP 512. At step 10 the TR-TSP 512 sends a FIDO prompt to the user device 100. The user 240 provides authentication, which may be via a face or fingerprint input, at the user device 100 at step 11. In other words, the user device 100 performs a biometric scan of the user 210 and, if successful, uses the FIDO private key to sign a challenge response for an authentication response message. The user device 100 sends the authentication information (e.g., in some cases, a signed challenge response that was signed using the FIDO private key) to the issuer 240 at step 12. At step 13 the card issuer 240 returns an authentication reference to the TR-TSP 512. At step 14 there is an action to validate the authentication reference performed by the TR-TSP 512. The TR-TSP 512 then validates the authentication information. For example, the TR-TSP uses the corresponding FIDO public key (which is stored during the registration phase and bound to the token) to validate the authentication information, which includes a signed challenge response signed using the corresponding FIDO private key. If the validation is successful, the TR-TSP 512 then generates a TAVV at step 15. At step 16 the TAVV is forwarded to the checkout plugin 115. The checkout plugin 115 forwards the TAVV to the merchant 110 at step 17. The merchant 110 forwards a txn, token, and the TAVV to the acquirer 510 at step 19. At step 19 the acquirer 510 forwards the txn, token, and TAVV to the network TSP 230. The network TSP 230 forwards a PAN and the txn to the issuer 240 at step 20. At step 21 the issuer 240 accepts the txn. At step 22 the issuer 240 sends an approval to the acquirer 510, which then sends the approval to the merchant 110 at step 23.

Figure 6:
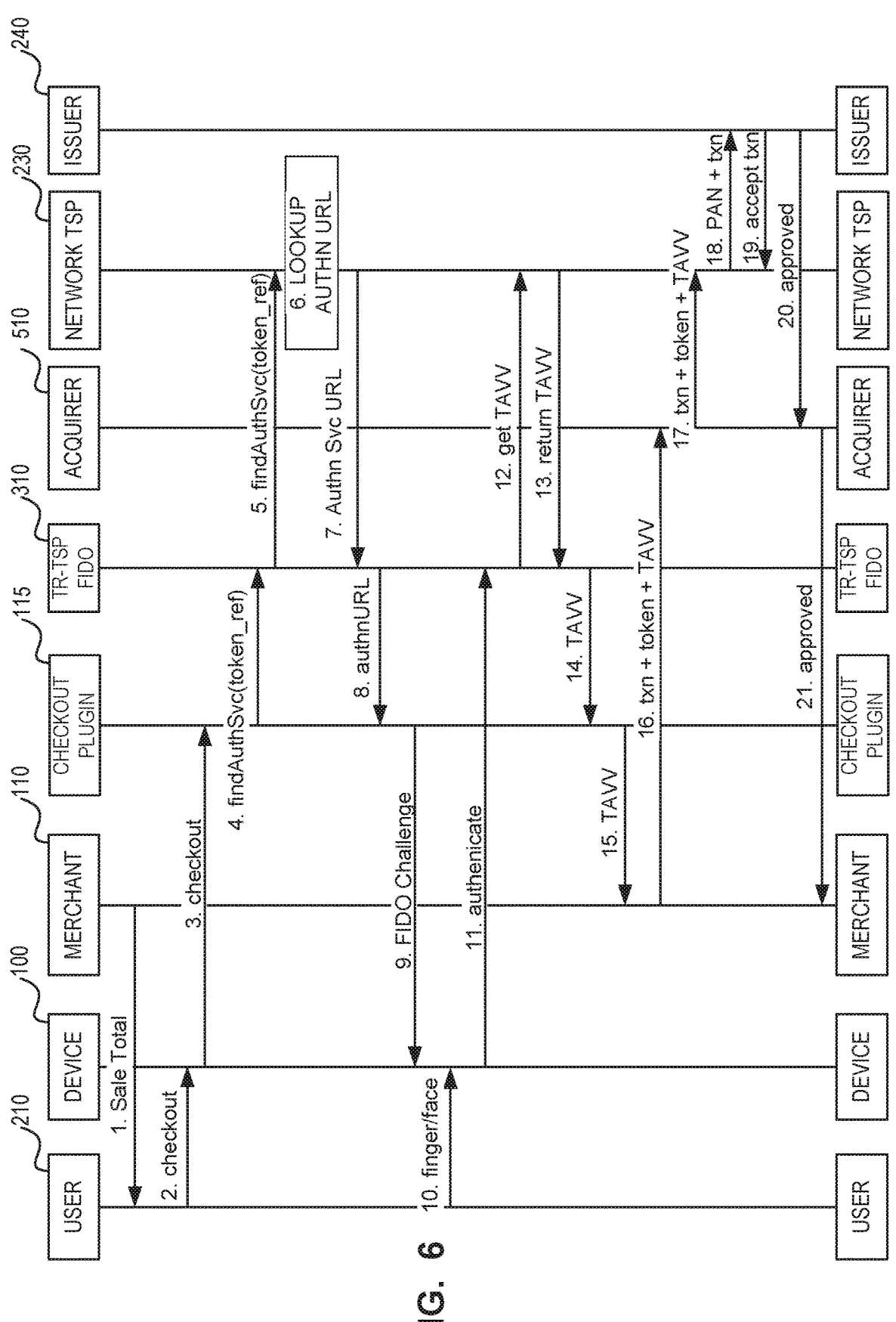
FIG. 6 is a flow diagram of a transaction or checkout process using a token in a dynamic token framework, and computing the SCA is performed between the TR-TSP server and the user device in accordance with at least one example embodiment.

FIG. 6 shows a flow diagram where, during the registration process, the TR-TSP was designated as the authenticator. In an example embodiment, this transaction process in FIG. 6 follows the registration process of FIG. 3. Therefore, the URL provided by the TSP 330 points to a TR-TSP 135 for authenticating the token. In an example aspect, the TR-TSP 135 is also the party that issues the FIDO challenge. The transaction flow in FIG. 6 represents a user 210 making a purchase via a merchant website 110. At step 1 the merchant 110 sends a sale total to a user 210. At step 2 the user 210 commences the checkout process at the user device 100. At step 3, the user device 100 directs to the checkout plugin 115. At step 4, the checkout plugin 115 sends a findAuthSvc(token_ref) instruction to the TR-TSP 310 associated with the FIDO service. The TR-TSP 310 associated with the FIDO service forwards the findAuthSvc(token_ref) instruction to the network TSP 230. There is an action at step 6 to lookup the authentication URL performed by the network TSP 230. The network TSP 230 uses the token_ref to search for the corresponding authentication URL. Alternatively, the lookup of the authentication URL may be performed by the TR-TSP 310 associated with the FIDO service. At step 7 the network TSP 230 sends the authentication service URL to the TR-TSP associated with the FIDO service. At step 8 the authentication URL is sent to the checkout plugin 115. At step 9 a FIDO challenge is issued by the checkout plugin 115 to the user device 100. At step 10 the user 210 provides authentication, which may be via a face or fingerprint input, at the user device 100. In other words, the user device 100 performs a biometric scan of the user 210 and, if successful, uses the FIDO private key to sign a challenge response for an authentication response message. The user device 100 sends the authentication information (e.g., in some cases, a signed challenge response that was signed using the FIDO private key to the TR-TSP 310 associated with the FIDO service at step 11. In some cases, the TR-TSP FIDO 310 uses a copy of the FIDO public key to validate the authentication information. If validated, at step 12 the TR-TSP 310 associated with the FIDO service requests a TAVV from the network TSP 230. The network TSP 230 returns the TAVV to the TR-TSP 310 associated with the FIDO service at step 13. At step 14 the TR-TSP 310 associated with the FIDO service sends the TAVV to the checkout plugin 115. The checkout plugin 115 sends the TAVV to the merchant 110 at step 15. The merchant 110 returns a transaction token (txn), a token, and the TAVV to an acquirer 510. The acquirer 510 forwards the txn, token, and TAVV to the network TSP 230 at step 17. At step 18 a PAN and the txn are provided to the issuer 240 by the network TSP 230. At step 19 the issuer 240 accepts the txn. At step 20 the issuer 240 sends an approval to the acquirer 510. At step 21 the acquirer 510 forwards the approval to the merchant 110.

Figure 7:
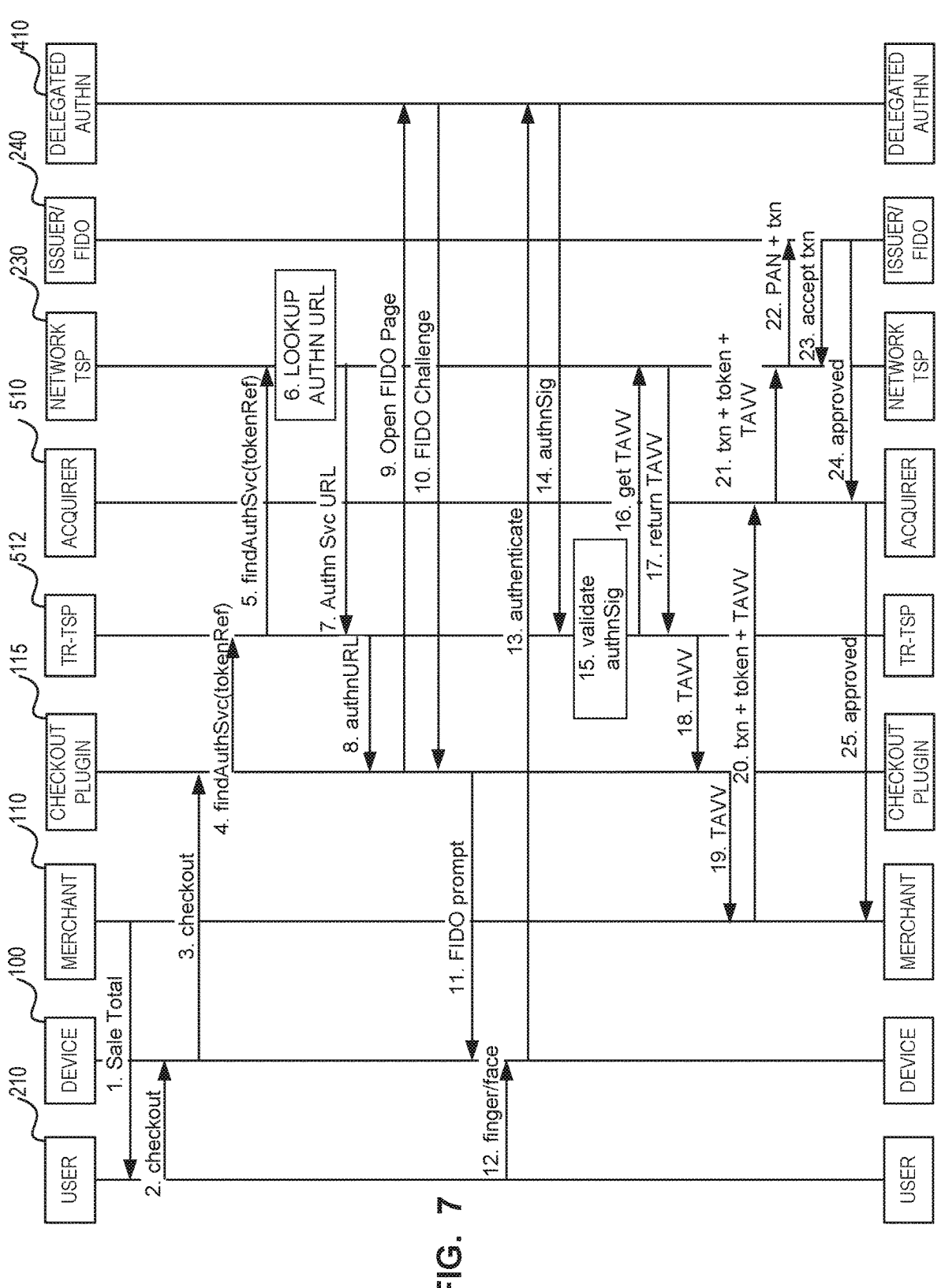
FIG. 7 is a flow diagram of a transaction or checkout process using a token in a dynamic token framework, and computing the SCA is performed between the delegated authentication server and the user device in accordance with at least one example embodiment.

FIG. 7 shows a flow diagram where, during the registration process, the delegated authenticator service 410 was designated as the authenticator. In an example embodiment, this transaction process in FIG. 7 follows the registration process of FIG. 4. Therefore, the URL provided by the TSP 330 points to a delegated authenticator service 410 for authenticating the token. In an example aspect, the delegated authenticator service 410 is also the party that issues the FIDO challenge. The delegated authenticator service 410 may represent a number of different card issuers or banking entities. The transaction flow in FIG. 7 represents a user 210 making a purchase via a merchant website 110. At step 1 the merchant 110 sends a sale total to a user 210. At step 2 the user 210 commences the checkout process at the user device 100. At step 3, the user device 100 directs to the checkout plugin 115. At step 4, the checkout plugin 115 sends a findAuthSvc(tokenRef) instruction to the TR-TSP 512. At step 5 the TR-TSP 512 forwards the findAuthSvc(tokenRef) instruction to the network TSP 230. There is an action at step 6 to lookup the authentication URL performed by the network TSP 230. Alternatively, the lookup of the authentication URL may be performed by the TR-TSP 512. At step 7 the network TSP 230 sends the authentication service URL to the TR-TSP 512. At step 8 the authentication URL is sent to the checkout plugin 115 by the TR-TSP 512. At step 9 the checkout plugin 115 opens the FIDO page and is directed to the delegated authenticator service 410. At step 10 the delegated authenticator service 410 issues a FIDO challenge to the checkout plugin 115. At step 11 the checkout plugin 115 forwards a FIDO prompt to the user device 100. The user 240 provides authentication, which may be via a face or fingerprint input, at the user device 100 at step 12. In other words, the user device 100 performs a biometric scan of the user 210 and, if successful, uses the FIDO private key to sign a challenge response for an authentication response message. At step 13, the user device 100 sends the authentication information (e.g., in some cases, a signed challenge response that was signed using the FIDO private key) to the delegated authenticator server 410. In some cases, the delegated authenticator server 410 uses the FIDO public key (corresponding to the FIDO private key) to validate the authentication information. At step 14 the delegated authenticator service 410 sends an authenticator signature message to the TR-TSP 610 to confirm and indicate that the delegation authenticator server 410 has successfully authenticated the user using FIDO authentication. At step 15 there is an action to validate the authenticator signature performed by the TR-TSP 610. If the authenticator signature is successfully validated, at step 16 the TR-TSP 610 requests a TAVV from the network TSP 230. At step 17 the network TSP 230 returns the TAVV to the TR-TSP 610. At step 18 the TAVV is forwarded to the checkout plugin 115. At step 19 the checkout plugin 115 forwards the TAVV to the merchant 110. The merchant 110 forwards a txn, token, and the TAVV to the acquirer 510 at step 20. At step 21 the acquirer 510 forwards the txn, token, and TAVV to the network TSP 230. The network TSP 230 forwards a PAN and the txn to the issuer 240 at step 22. At step 23 the issuer 240 accepts the txn. At step 24 the issuer 240 sends an approval to the acquirer 510, which then sends the approval to the merchant 110 at step 25. It will be appreciated that the entities shown in the above figures are computing devices. The merchant 110 is a computing server. The checkout plugin 115 is a module embedded within, or connected to, the merchant's website. The TR-TSP, the acquirer, the network TSP (or TSP), the issuer, the FIDO service, and the delegated authenticator are each implemented as computing servers.

Turning to FIG. 8, in an example aspect, the TSP executes a lookup of URLs according to its programmed hierarchical logic. First it searches a lookup table between URLs and PANs. An example URL and PAN table is shown in FIG. 9. If there is a match, then the token is in the form of a PAN. If the table does not produce any result or match, then the TSP looks up a table between the URLs and Bank Identification Numbers (BINs). An example URL and BIN table is shown in FIG. 10. If there is a match, then the token is in the form of a BIN. If the table does not produce any result or match, then the TSP executes a default entity to execute the authentication. For the example, default entity does not generate and send a FIDO challenge.

Turning to FIG. 11, the computing architecture includes one or more users 101 and their user devices 100. Examples of user devices 100 include mobile devices, laptops, desktop computers, tablets, smart phones, etc. A user device 100 includes hardware components 102, examples of which include a processor, memory, a communication module (e.g., for communicating via a cell network, WiFi, LAN, WAN, etc.), and a user interface (e.g., display screen, touch interface, keyboard, mouse, etc.). In an example embodiment, one communication module (e.g., Comm.A in FIG. 1)

is for WiFi communication (i.e., a non-cellular network communication) and another communication module (e.g., Comm.B in FIG. 1) is for cellular network communication. In other words, the user device 100 includes at least two types of communication radio devices, including a WiFi radio communication module and a cellular network communication module (e.g., a radio device compatible with 3G, 4G, 5G, and later generations of cellular communication networks). These hardware components 102 can vary in type, number and architecture as user devices 100 continue to develop. In an example aspect, the user device 100 includes a browser 103a, or a native application (also called an app) 103b, or both. The browser 103a or the native app 103b, or both, are more generally herein referred to as the user agent 104. The browser or native app connects through the Internet to the merchant server. The user agent 104 displays a graphical user interface (GUI) on a display screen to guide the user through the authentication process and the related action (e.g., logging in, executing a command, a transaction, accessing data, etc.).

The user device 100 also has a device authenticator (DA) 105, which is used to store user-identifying data on the device in a secure manner and to authenticate the user 101. In an example aspect, device authenticator 105 is a hardware device or hardware component that includes a secure execution and secure storage environment, and which can be implemented using one or more of: a Trusted Execution Environment (TEE); a secure element, a firewall; a software layer; a secure enclave; a Hardware Secure Module (HSM); etc. It will be appreciated that a TEE is a computing chip that, for example, exists on a processor device. It will be appreciated that a HSM is a separated computing appliance. Preferably, in an example embodiment, the device authenticator 105 is a secure hardware component that also includes software security. Authentication data about a user 101 can be stored in the device authenticator 105. The authentication data about the user 101, for example, includes a device authentication private key (also referred to as a DA private key) associated with the user 101 and the device authenticator 105 of the device 100. In an example aspect of using the FIDO protocol, the DA private key is known as a FIDO private key. In another example aspect, the device authenticator 105 may also store other data, including, but not limited to: biometric authentication data, passwords, security codes, name, address, account numbers (e.g. like a primary account number (PAN), driver's license number, etc.), age, date of birth, citizenship, credentials, etc.

The user device 100 may also include one or more scanners 106. Examples of scanners 106 includes a rear camera 106a, a front camera 106b, a radio frequency identification (RFID) scanner 106c, a thumbprint scanner 106d, a heartrate monitor, a microphone for voice detection, etc. In an example embodiment, a face scanning system includes a dot projector that projects infrared dots on a person's face and an infrared camera takes an image of the face and the dots. The thumbprint scanner 106d, the heartrate monitor, the microphone for voice detection, and the face scanning system are examples of biometric sensors used to verify the identity of a user 101 based on scanning or collecting biometric data. It is appreciated that currently known and future known scanners can be used to verify that the correct person is truly interacting with their user device 100.

The device authenticator 105, for example, interacts with a scanner 106 to obtain identifying data about the user 101, and compares the scanned identifying data about the user 101 with stored identifying data about the user. For example, the identifying data about the user is biometric authentication data, including and not limited to one or more of: fingerprint scan, eye scan, facial recognition, voice recognition, heartbeat or pulse monitoring, DNA sampling, body temperature, etc. The scanner 106 includes one or more sensors that can capture the biometric authentication data.

In preferred example embodiments, the processes described herein use a scanner 106. It will also be appreciated that the identifying information about the user 101 can include data that is not biometric in nature. For example, other identifying information includes a password, a pin, a swipe pattern, a code, etc.

It will be appreciated that the user device 100 further includes a data bus that facilitates the flow of data between the components and the processor. In other words, the components of the user device are connected to the data bus.

Continuing with FIG. 11, in an example embodiment, the device authenticator 105 and the one or more scanners 106 are built into the user device 100.

In another example embodiment, the device authenticator 105 and the scanner 106 are part of an external authenticator device 100'. The user device 100 and the external authenticator device 100' are in data communication with each other. For example, the external authenticator device 100' is connected to the user device 100 via a wire or some other electrical connection (e.g., universal serial bus (USB)). In another example, the external authenticator device 100' is connected to the user device 100 via wireless communication. Examples of wireless communication include Bluetooth, Near Field Communication, and WiFi. Example embodiments of an external authenticator device 100' include a smart watch, a USB key, a dongle, and a smartphone. The term "user device" collectively refers to the user device 100 and an external authenticator device 100', in embodiments that include an external authenticator device.

The one or more user devices 100 are in data communication with a data network 130. The system also includes other servers which are also in data communication with the data network 130. A "server" herein refers to a computing system that can include one server computer or multiple server computers that are networked to operate together. A server includes one or more processors, memory, and a data communication module for connecting to the network 130. A server also includes software and other logic modules for storing data and executing instructions.

A server that provides a FIDO service 120, or performs FIDO authentication, executes processes that establish and attests to the identity of a user. This server is herein called an ID server, but as per the above, different servers can take on the role of ID server. In an example aspect, for the purpose of establishing identity, the ID server verifies the identity of the user 101 against a trusted government credential using facial biometrics, or other user identity information, or a combination thereof. In another example aspect, for the purpose of attestation, the ID server executes the FIDO protocol to store registered and authenticated user accounts. For example, the ID server performs Strong Identity using facial biometric data captured image of a user against either a reference image or a cropped image of a credential with methods described in the different embodiments. In an example aspect, the ID server and the user device 100 use video recording to conduct a liveness detection of the person, such as live movement of the person's face. The ID server attests to the authentication of a user 101 by sending a challenge to the user device 100 of the user, receiving a response to the challenge that is signed by the device authenticator 105 of the user device 100, and authenticating the response using the FIDO protocol. For new users, the ID server also executes a registration process that includes verifying facial biometric data.

In the examples provided herein, an initial condition may already be established that includes a device authentication private key being securely stored on the device authenticator 105, and the corresponding device authentication public key being stored on the ID server 111. The generation and storage of these keys, for example, adhere to the FIDO protocols developed by the FIDO Alliance (www.fidoalliance.com). In an example aspect, the device authenticator 105 generates the device authenticator private key and the device authenticator public key, and the device authenticator 105 sends the device authenticator public key to the ID server 111 for storage. The device authentication private key can be used to sign responses. These signed responses can include other data, depending on the application. For example, signed responses can include credential data, authorization data, commands, transaction details, etc.

The trusted verifier server, also called the TVS, executes processes to verify an identity document. The TVS for example is specific to a certain organization depending on the type of identity document. For example, a government entity may have a TVS that verifies a government issued identity document (e.g., a passport). A DMV entity, for example, has a TVS 109 that verifies driver licenses, which are a type of identity document. A credit check organization, for example, has a TVS that verifies credit card identity documents. A healthcare entity, for example, has a TVS that verifies healthcare identity documents. The TVS, for example, is in data communication with one or more of the other servers and verifies the identity document associated with a user.

The term "identity document" herein refers to a document that includes identity information or credential information, or both, about a user. In an example embodiment, the identity document includes a photograph of the user. Other types of information that an identity document could include are, for example: name, address, data of birth, sex, citizenship, weight, height, signature, serial number, issue date, expiry date, a code, a bar code, a QR code, special markings (e.g., water markings, holographic markings, stamps, insignia, etc.), a signature of a user, data related to a user account, credentials of the user, data related to the organization, etc. Examples of identity documents include: a driver license, a passport, a healthcare card, a student card, a citizenship or national identity card, an employee card, an academic certificate, a government document, and a health report. Other types of identity documents can be used according to the principles described herein.

In an example embodiment, a system is provided comprising:

a user device, a merchant server, a token service provider, and a FIDO service server, the token service provider server storing thereon a lookup table comprising URLs and tokens;

the merchant server configured to provide a webpage for display on the user device for a transaction, the webpage comprising a checkout plugin that is configured to receive payment information;

the checkout plugin configured to transmit a given token to the token service provider, the given token bound to the user device;

the token service provider configured to search the lookup table using the given token to obtain a given URL that corresponds to the given token, and to transmit the given URL to the merchant plugin;

the merchant plugin transmitting the given token to the FIDO service provider that is addressed at the given URL;

the FIDO service provider transmitting a FIDO challenge to the user device, via the merchant plugin;

the user device initiating a FIDO authentication using the FIDO challenge, and providing a FIDO challenge response to the FIDO service provider;

after the FIDO service provider authenticates the FIDO challenge response, the FIDO service provider obtains a token authentication verification value (TAVV) and transmits the TAVV to the merchant server; and the merchant server is configured to transmit the TAVV, the token and transaction data for the transaction into an electronic payment network to complete the transaction.

It will be appreciated that any module or component exemplified herein that executes instructions may include or otherwise have access to non-transitory computer readable media such as storage media, computer storage media, or data storage devices (removable and/or non-removable) such as, for example, memory chips, magnetic disks, optical disks. Computer storage media may include volatile and non-volatile, removable and non-removable media implemented in any method or technology for storage of information, such as computer readable instructions, code, processor executable instructions, data structures, program modules, or other data. Examples of computer storage media include random access memory (RAM), dynamic random access memory (DRAM), static random access memory (SRAM), read-only memory (ROM), solid-state ROM, electrically erasable programmable read-only memory (EEPROM), flash memory or other memory technology, or any other medium which can be used to store the desired information and which can be accessed by an application, module, or both. Any such computer storage media may be part of the servers or computing devices, or accessible or connectable thereto. Any application or module herein described may be implemented using computer readable/executable instructions that may be stored or otherwise held by such computer readable media.

It will be appreciated that different features of the example embodiments of the system and methods, as described herein, may be combined with each other in different ways. In other words, different devices, modules, operations, functionality and components may be used together according to other example embodiments, although not specifically stated.

The steps or operations in the flow diagrams described herein are just for example. There may be many variations to these steps or operations according to the principles described herein. For instance, the steps may be performed in a differing order, or steps may be added, deleted, or modified.

The elements and screenshots of the GUIs shown herein are just for example. There may be many variations to these GUI elements or operations according to the principles described herein. For instance, the GUI elements and operations may be performed in a differing order, or GUI elements or operations may be added, deleted, or modified.

It will also be appreciated that the examples and corresponding system diagrams used herein are for illustrative purposes only. Different configurations and terminology can be used without departing from the principles expressed herein. For instance, components and modules can be added, deleted, modified, or arranged with differing connections without departing from these principles.

Although the above has been described with reference to certain specific embodiments, various modifications thereof will be apparent to those skilled in the art without departing from the scope of the claims appended hereto.

The invention claimed is:

1. A system comprising:

a user device, a website server, a token service provider, and a (Fast Identity Online (FIDO) service server, the token service provider server storing thereon a look-up table comprising Uniform Resource Locators (URLs) and tokens;

the website server configured to provide a webpage for display on the user device for a transaction, the webpage comprising a checkout plugin that is configured to receive payment information;

the checkout plugin configured to transmit a find authentication service instruction including a given token to the token service provider, the given token bound to the user device and is a proxy to a Primary Account Number (PAN);

responsive to receiving the find authentication service instruction, the token service provider configured to search the look-up table using the given token to obtain a given authentication URL that corresponds to the given token, and to transmit the given authentication URL to the checkout plugin;

responsive to receiving the given authentication URL, the checkout plugin transmitting the given token to the FIDO service provider that is addressed at the given authentication URL;

the FIDO service provider transmitting a FIDO challenge to the user device, via the checkout plugin;

the user device initiating a FIDO authentication using the FIDO challenge by digitally signing the FIDO challenge using a FIDO private key for generating a FIDO challenge response, and providing the FIDO challenge response to the FIDO service provider;

the FIDO service provider authenticating the FIDO challenge response by using a FIDO public key that corresponding to the FIDO private key;

responsive to the FIDO service provider authenticating the FIDO challenge response, the FIDO service provider obtains a token authentication verification value (TAVV) and transmits the TAVV to the website server; and the website server is configured to transmit the TAVV, the token and transaction data for the transaction into an electronic payment network to complete the transaction.

2. The system of claim 1, wherein, during a registration process, the FIDO service provider is configured to send the given authentication URL to connect with the user device, and after successfully receiving from the user device a FIDO registration response, the FIDO registration response including a FIDO public key, the FIDO service provider binds a FIDO public key with the token.

3. The system of claim 2, wherein, during the registration process, the token or a token reference, or both, are stored in association with the given authentication URL.

4. The system of claim 1, wherein the checkout plugin comprises an iframe within the webpage.

5. The system of claim 1, wherein the FIDO authentication comprises the user device executing a biometric scan.

* * * * *